United States Patent [19]

Katoh

[11] Patent Number: 5,049,762
[45] Date of Patent: Sep. 17, 1991

[54] OPTICAL WAVELENGTH CONVERTER SYSTEM

[75] Inventor: Takayuki Katoh, Kanagawa, Japan

[73] Assignee: Fuji Photo Film Co., Ltd., Kanagawa, Japan

[21] Appl. No.: 597,601

[22] Filed: Oct. 15, 1990

Related U.S. Application Data

[63] Continuation-in-part of Ser. No. 407,072, Sep. 14, 1989, abandoned.

[30] Foreign Application Priority Data

Sep. 14, 1988 [JP] Japan ............................. 1-230595
Oct. 13, 1989 [JP] Japan ............................. 2-267669
Mar. 14, 1990 [JP] Japan ............................. 65-63731

[51] Int. Cl.$^5$ ............................................. H03F 7/00
[52] U.S. Cl. .................................. 359/332; 385/130; 385/122
[58] Field of Search ................ 307/425, 427, 430; 350/96.34, 96.12

[56] References Cited

U.S. PATENT DOCUMENTS

| | | | |
|---|---|---|---|
| 4,707,066 | 11/1987 | Falkenstein | 350/96.20 |
| 4,803,689 | 2/1989 | Shibanuma | 372/36 |
| 4,820,011 | 4/1989 | Umegaki et al. | 350/96.19 |
| 4,830,447 | 5/1989 | Kamiyama et al. | 350/96.12 |

Primary Examiner—James W. Davie
Attorney, Agent, or Firm—Sughrue, Mion, Zinn Macpeak & Seas

[57] ABSTRACT

An optical wavelength converter system includes a light source for emitting a fundamental wave, a fiber or optical waveguide type optical wavelength converter device for converting the wavelength of the fundamental wave and emitting a wavelength-converted wave, and an optical system for introducing said fundamental wave into the optical wavelength converter device. The optical wavelength converter device includes an element made of an organic nonlinear optical material and covered with a cladding layer which has a smaller refractive index than the refractive index of said element. The optical wavelength converter device is housed in a closed container which is filled with an inert medium such as perfluorocarbon oil to keep the element out of contact with an atmosphere such as air.

10 Claims, 3 Drawing Sheets

FIG.1
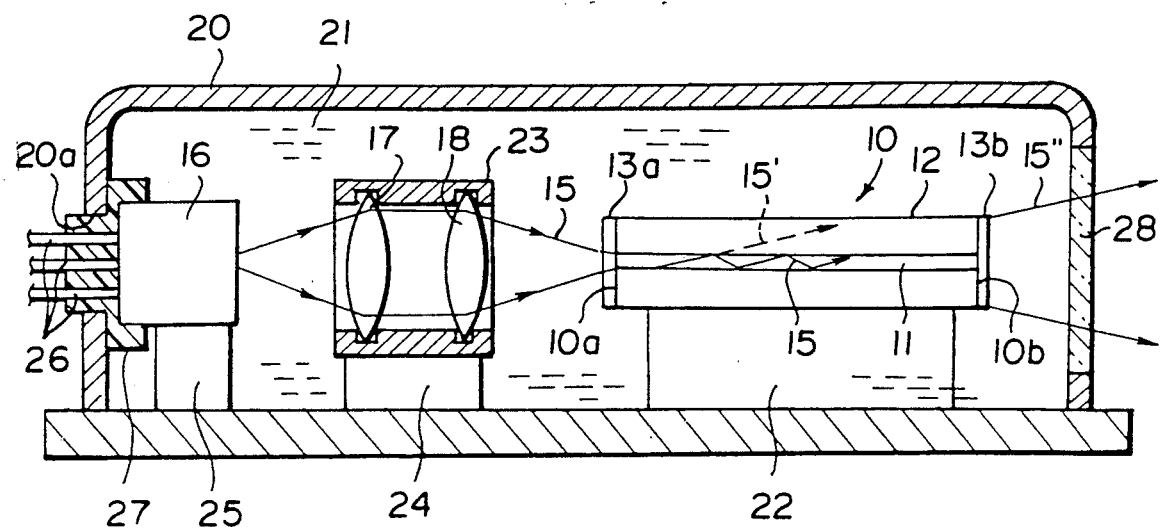
FIG.2
FIG.3
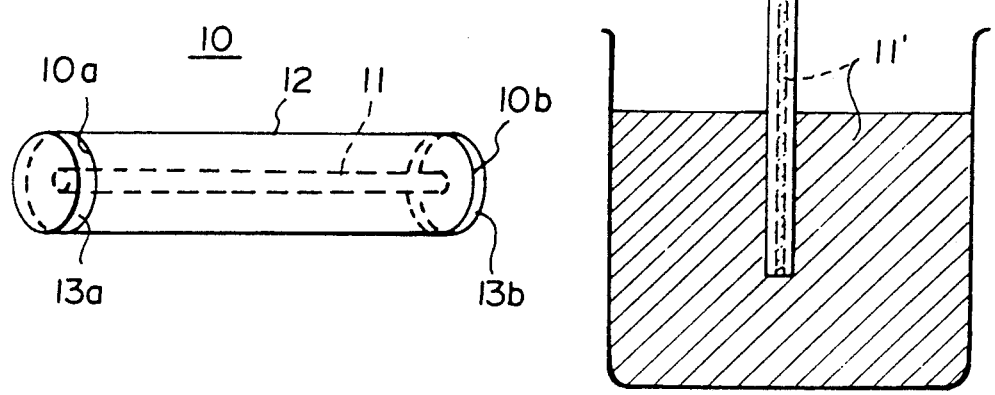

OPTICAL WAVELENGTH CONVERTER SYSTEM

This application is a continuation-in-part application of application Ser. No. 407,072 filed Sept. 14, 1989 now abandoned.

BACKGROUND OF THE INVENTION

1. Field of the Invention

The present invention relates generally to an optical wavelength converter system for converting a fundamental wave into a second harmonic, or for converting fundamental waves into a wave having a frequency equal to the difference between or the sum of the frequencies of the fundamental waves, and more particularly to an optical wavelength converter system employing an optical wavelength converter device made of an organic nonlinear optical material.

2. Description of the Prior Art

Various attempts have heretofore been made for converting the wavelength of a laser beam into a second harmonic, i.e., shortening the wavelength of a laser beam, using a nonlinear optical material. One well known example of an optical wavelength converter device for effecting such laser wavelength conversion is a bulk crystal type converter device as disclosed, for example, in *Introduction to Optical Electronics*, pages 200–204, written by A. Yariv and translated by Kunio Tada and Takeshi Kamiya (published by Maruzen K. K.), pages 200–204. This optical wavelength converter device relies upon the birefringence of a crystal in order to meet phase matching conditions. Therefore, any material which does not exhibit birefringence or exhibits only small birefringence cannot be employed even if it has high nonlinearity.

To solve the above problem, a fiber type optical wavelength converter device has been proposed. The optical wavelength converter device of this type is in the form of an optical fiber comprising a core made of a nonlinear optical material and surrounded by a cladding. One example of such an optical fiber is shown in the Vol. 3, No. 2, pages 28–32, Bulletin of the Microoptics Research Group of a Gathering of the Applied Physics Society. Recently, many efforts are directed to the study of a fiber type optical wavelength converter device since it can easily gain phase matching between a guided mode in which a fundamental is guided through the core and a radiated mode in which a second harmonic is radiated into the cladding. Also known, as disclosed in U.S. Pat. No. 4,820,011, is a two-dimensional optical waveguide type optical wavelength converter device which includes a slab-shaped optical waveguide of nonlinear optical material sandwiched between two substrates that serve as a cladding layer. An optical wavelength converter device comprising a three-dimensional optical waveguide of nonlinear optical material embedded in a single substrate that serves as a cladding layer is also known. These optical waveguide type optical wavelength converter devices have the same features referred to above.

Various proposals have been made in recent years to use monocrystalline organic nonlinear optical materials in the fiber and optical waveguide type optical wavelength converter devices. Since organic nonlinear optical materials have much larger nonlinear optical constants than those of inorganic optical materials, they can achieve a high efficiency with which the wavelength of an applied wave can be converted. Examples of such organic nonlinear optical materials include MNA (2-methyl-4-nitroaniline), mNA (metanitroaniline), POM (3-methyl-4-nitropyridine-1-oxide), urea, NPP [N-(4-nitrophenyl)-(S)-prolinol], NPAN {2-[N-(4-nitrophenyl)-N-methylamino]acetonitrile], DAN (2-dimethylamino-5-nitroacetoanilide], MBA-NP [2-N($\alpha$-methylbenzylamino)-5-nitropyridine], (as disclosed in Japanese Unexamined Patent Publication No. 60(1985)-250334, *Nonlinear Optical Properties of Organic and Polymeric Materials*, ACS SYMPOSIUM SERIES 223, edited by David J. Williams and published by American Chemical Society in 1983, *Organic Nonlinear Optical Materials* supervised by Masao Kato and Hachiro Nakanishi and published by CMC in 1985, *Nonlinear Optical Properties of Organic Molecules and Crystals* edited by D. S. Chemla and J. Zyss and published by Academic Press Inc. in 1987, and *The Quality and Performance of The Organic Non-Linear Optical Material(—)2-($\alpha$-Methylbenzylamino)-5-Nitropyridine (MBA-NP)*, Vol. 65, No. 8, page 229, written by R. T. Bailey et al. and published by Optics Communications), and 3,5-dimethyl-1-(4-nitrophenyl)pyrazole,3,5-dimetyl-1-(4-nitrophenyl)-1,2,4-triazole, 2-ethyl-1-(4-nitrophenyl)imidazole, 1-(4-nitrophenyl)pyrrole, 2-dimethylaminol-5-nitroacetoanilide, 5-nitro-2-pyrrolidiacetoanilide, 3-methyl-4-nitropyridine-N-oxide, etc., (as disclosed in U.S. patent application Ser. No. 263,977, now U.S. Pat. No. 4,982,112). For example, the wavelength conversion efficiency of MNA is about 2000 times higher than that of $LiNbO_3$ which is an inorganic nonlinear optical material. If an optical wavelength converter device is made of MNA, then it can generate a laser beam of a short wavelength in a blue region which is produced as a second harmonic of a fundamental wave that is applied as an infrared laser beam emitted from a general semiconductor laser, which is small in size and low in cost.

It has been recognized that the fiber or optical waveguide type optical wavelength converter device, with its optical fiber core or optical waveguide made of an organic nonlinear optical material, is disadvantageous in that the wavelength conversion efficiency and the incident coupling efficiency for a fundamental applied thereto become greatly reduced with time. More specifically, when the ends of the organic nonlinear optical material contact a surrounding atmosphere such as air, it sublimes from the ends, either shortening its monocrystalline section or getting modified to the extent that the monocrystalline structure is lost. The three-dimensional optical waveguide type optical wavelength converter device has its optical waveguide embedded in a surface of the substrate. Therefore, the above problem is likely to occur since the surface of the organic nonlinear material, as well as the ends thereof, contacts the surrounding atmosphere.

SUMMARY OF THE INVENTION

It is a principal object of the present invention to provide an optical wavelength converter system which eliminates the aforesaid drawbacks of the conventional optical wavelength converter devices.

In accordance with one aspect of the present invention, an optical wavelength converter system includes a fiber or optical waveguide type optical wavelength converter device made of an organic nonlinear optical material, a light source for generating a fundamental wave, an optical system for introducing the fundamental wave into the optical wavelength converter device, and a closed container housing the optical wavelength converter device, the light source, and the optical system, the closed container having a transparent window for transmitting therethrough a wavelength-converted wave emitted from the optical wavelength converter device, and the closed container being filled with an inert medium.

In accordance with another aspect of the present invention, an optical wavelength converter system includes a fiber or optical waveguide type optical wavelength converter device made of an organic nonlinear optical material, a light source for generating a fundamental wave, an optical system for introducing the fundamental wave into the optical wavelength converter device, and a closed container which houses the optical wavelength converter device and is provided with an inlet transparent window which transmits therethrough the fundamental wave emanating from the optical system and an outlet transparent window which transmits therethrough a wavelength-converted wave emitted from the optical wavelength converter device, the closed container being filled with an inert medium.

Since the exposed end surfaces or other surfaces of the organic nonlinear optical material are held in contact with the inert medium, the organic nonlinear optical material is prevented from subliming or being modified.

As the inert medium, inert gas is preferable to inert liquid for the following reason. That is, the refractive index of the inert liquid depends upon the temperature more than that of the inert gas. Accordingly, when the inert liquid is used, the point on which the fundamental wave is focused by the optical system is apt to fluctuate depending on the ambient temperature, which lowers the incident coupling efficiency into the optical wavelength converter device. Further, the wave surface of the wavelength-converted wave which is emitted from the optical wavelength converter device and is transmitted through the inert liquid is apt to be distorted due to change in the refractive index of the inert liquid, which makes it difficult to focus as a small spot.

Preferably, as disclosed in U.S. Pat. No. 4,830,447, isolating layers for isolating the end surfaces of the organic nonlinear optical material from the inert medium are mounted on these end surfaces for the following reason: even with the organic nonlinear optical material kept in contact with the inert medium, the organic nonlinear optical material may sublime or get modified, but it is at a rate much slower than if it were held in contact with a surrounding atmosphere such as air. The isolating layers are effective in reliably preventing the organic nonlinear optical material from subliming or becoming modified since the end surfaces thereof are fully kept out of contact even with the inert medium. If the isolating layers are made of an organic resin, they have a stability problem. However, the isolating layers are prevented from being deteriorated (e.g., being deformed by absorption of water vapor or being deteriorated in its physical properties by oxidization) by the atmosphere since the isolating layers are surrounded by the inert medium.

The above and other objects, features and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 1 is a schematic side elevational view, partly in cross section, of an optical wavelength converter system in accordance with a first embodiment of the present invention, FIG. 2 is a perspective view of an optical wavelength converter device in the optical wavelength converter system shown in FIG. 1, FIG. 3 is a schematic view illustrating a process for manufacturing the optical wavelength converter device shown in FIG. 2.

DESCRIPTION OF THE PREFERRED EMBODIMENT

Figure 4:
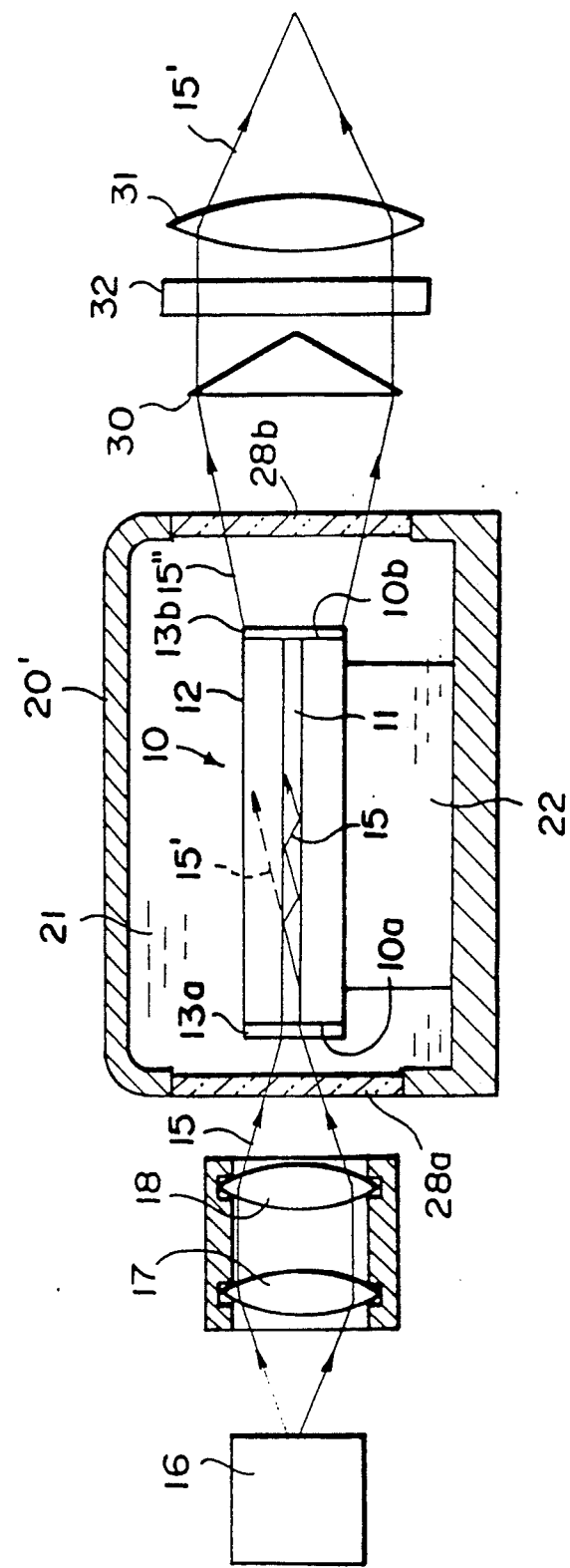
FIG. 4 is a schematic side elevational view, partly in cross section, of an optical wavelength converter system in accordance with a second embodiment of the present invention.

FIG. 1 shows an optical wavelength converter system in accordance with a first embodiment of the present invention. The optical wavelength converter system includes a fiber type optical wavelength converter device 10, a semiconductor laser 16 for emitting a laser beam or fundamental wave 15 the wavelength of which is to be converted by the optical wavelength converter device 10, and an optical system composed of a collimator lens 17, and an objective lens 18 for introducing the fundamental wave 15 into a core 11 of the optical wavelength converter device 10. The optical wavelength converter device 10, the semiconductor laser 16, and the optical system are housed in a closed container 20. The closed container 20 is filled with an inert medium 21 which comprises perfluorocarbon oil. The optical wavelength converter device 10 is supported on a holder 22. The lenses 17, 18 are supported in a lens barrel 23 supported on a holder 24. The semiconductor laser 16 is supported on a holder 25. These holders 22, 24, 25 are fixed on the bottom plate of the container 20. The semiconductor laser 16 is connected to power supply leads 26, which extend out of an opening 20a, defined in the container 20 through a current terminal hermetic seal 27 fitted in the opening 20a. The current terminal hermetic seal 27 closes the opening 20a to keep the interior of the container 20 in a fluid-tight condition.

The optical wavelength converter device 10 will be described in detail below. As shown in FIG. 2, the optical wavelength converter device 10 comprises an optical fiber including a core 11 made of a nonlinear optical material which is fitted into the hollow space defined centrally in a cladding 12. The nonlinear optical material is an organic nonlinear optical material having a high wavelength conversion efficiency. In this embodiment, the core 11 is made of 3,5-dimethyl-1-(4-nitrophenyl) pyrazole: hereinafter referred to as "PRA"), as disclosed in Japanese Unexamined Patent Publication No 62(1987)-210432.

A process for manufacturing the optical wavelength converter device 10 in which the core 11 is made of PRA and the cladding 12 is made of SFS3 glass will be described below. A hollow glass fiber 12' which will serve as the cladding 12 is provided. The hollow glass fiber 12' has an outside diameter of about 3 mm and the hollow space therein has a diameter of about 2 μm. As shown in FIG. 3, PRA is kept as a molten solution 11' in a furnace, and one end of the glass fiber 12' is immersed in the molten solution 11'. Then, the molten PRA solution 11' enters the hollow space in the glass fiber 12' due to capillarity. The molten solution 11' is kept at a temperature slightly higher than the melting point (102° C.) of PRA in order to prevent the PRA from being decomposed. Thereafter, the glass fiber 12' is quenched to cause the PRA in the hollow space to be polycrystallized.

Then, the optical fiber 12' is gradually pulled from the furnace, which is kept at a temperature higher than the melting point of PRA (e.g., 102.5° C.) into an outer space which is kept at a temperature lower than that melting point, thereby causing the molten PRA to be monocrystallized continuously from the point where it is withdrawn from the furnace. The core 11 thus prepared is of a highly long monocrystalline form, 50 mm long or longer, and has a uniform crystal orientation. The optical wavelength converter device 10 is therefore sufficiently long. Since, as is well known in the art, the wavelength conversion efficiency of an optical wavelength converter device of this type is proportional to the length of the device, the longer the optical wavelength converter device, the greater the practical value of the device.

After the core 11 has been fitted into the glass fiber 11', the opposite ends fiber 11' are cut off, and coated with an acryl resin such as acryl styrene copolymer, thus forming isolating layers 13a, 13b. The isolating layers 13a, 13b may be formed by preparing an aqueous solution of an acrylic resin, immersing the ends of the glass fiber 11' into the solution, and then drying the coated ends of the glass fiber 11'. Each of the isolating layers 13a, 13b is, for example, about 1 $\mu$m thick. In this manner the optical wavelength converter device 10 shown in FIGS. 1 and 2 is fabricated.

The optical wavelength converter device 10 will be used as shown in FIG. 1. A divergent laser beam (serving as a fundamental wave) 15 having a wavelength of 870 nm and emitted from the semiconductor laser 16 is converted by the collimator 17 into a parallel beam which is converged by the objective lens 18 and applied through the isolating layer 13a to an end surface 10a of the device 10. The laser beam 15 is focused onto the end surface of the core 11 as a small spot which is of the same diameter (2 $\mu$m) as that of the core 11. The laser beam 15 now enters the core 11. The fundamental wave 15 is converted by the PRA of the core 11 into a second harmonic 15' the wavelength of which is ½ of the wavelength of the fundamental wave 15. The second harmonic 15' is radiated into the cladding 12, and travels toward the other end of the device 10 while it is totally reflected repeatedly by the outer surface of the cladding 12. Phase matching is achieved between a guided mode in which the fundamental wave 15 is guided through the core 11 and a radiated mode in which the second harmonic 15' is radiated into the cladding 12 (so-called "Cherenkov radiation").

A beam 15" including the second harmonic 15' is emitted from an exit end surface 10b of the optical wavelength converter device 10. The emitted beam 15" is then emitted out of the closed container 20 through the transparent window 28, and passes through a filter (not shown) which extracts only the second harmonic 15' for use. The filter and lenses for collimating and focusing the second harmonic 15' may be arranged in the closed container 20, so that the focused second harmonic 15' may be emitted through the transparent window 28.

Since the optical wavelength converter device 10 is confined within the perfluorocarbon oil 21, the end surfaces of the core 11 which is made of PRA are kept out of contact with the atmosphere such as air. Therefore, the core 11 is prevented from subliming or becoming modified. The isolating layers 13a, 13b on the opposite ends of the optical wavelength converter device 10 hold the end surfaces 10a, 10b of the core 10 out of contact with the perfluorocarbon oil 21, to reliably prevent the core 11 from subliming or getting modified.

FIG. 4 shows an optical wavelength converter system in accordance with a second embodiment of the present invention. In FIG. 4, the parts analogous to those shown in FIG. 1 are given the same reference numerals and will not be described here. In FIG. 4, reference numeral 30 denotes a collimator lens which collimates the beam 15" emitted from the exit end surface 10b of the optical wavelength converter device 10, reference numeral 32 denotes a filter which permits only the second harmonic 15' to pass therethrough, and reference numeral 31 denotes a lens for focusing the second harmonic 15'. The optical wavelength converter system of this embodiment differs from the first embodiment mainly in that only the optical wavelength converter device 10 is housed in a closed container 20'. The closed container 20' has an inlet transparent window 28a through which the fundamental wave 15 is introduced into the core 11 of the optical wavelength converter device 10 and an outlet transparent window 28b through which the emitted beam 15" is emitted out of the closed container 20'.

The optical wavelength converter system of the second embodiment is advantageous over the first embodiment in the following point. That is, in the case of the first embodiment where the semiconductor laser 16, the optical wavelength converter device 10 and the optical system including the collimator lens 17 and the objective lens 18 are all housed in the closed container 20, the optical axes of these parts must be aligned in the closed container 20, which is very difficult. On the other hand, in the case of the second embodiment, the optical axes alignment can be accomplished by positioning the closed container 20' carrying therein the optical wavelength converter device 10 with respect to the optical axes of the laser 16 and the optical system, which is relatively easy.

Figure 5:
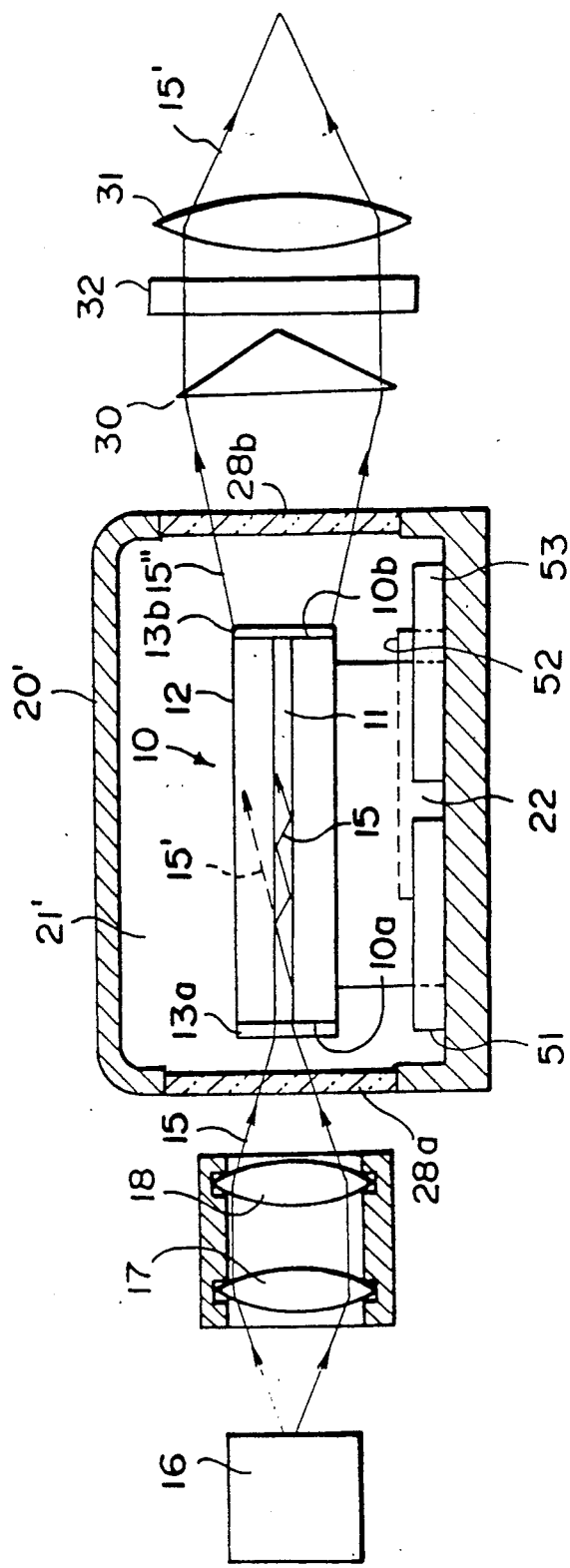
FIG. 5 is a view similar to FIG. 4 but showing a modification of the second embodiment.

FIG. 5 shows a modification of the optical wavelength converter system of the second embodiment. In this modification, the closed container 20' is filled with dry $N_2$ (nitrogen) gas 21' instead of perfluorocarbon, and deoxidizer 51, dehydrator 52 and adsorbent 53 are fixed in the closed container 20'. The deoxidizer 51, dehydrator 52 and adsorbent 53 remove, from the atmosphere of the optical wavelength converter device 10, moisture, solvent, and active gas such as oxygen which mingle with the $N_2$ gas 21', vaporize from the resin of the isolating layers 13a and 13b or adhere to the inner wall surface of the closed container 20'. With this arrangement, deterioration of the isolating layers 13a and 13b by oxidization (in the case of isolating layers of resin) or fungal growth on the isolating layers 13a and 13b (in the case of isolating layers of natural or semisynthetic high polymer such as gelatin, casein, collagen or cellulose) can be prevented.

As the deoxidizer 51, iron deoxidizers, those consisting of activated carbon and ortho-diphenol, or the like can be used. As the dehydrator 52, activated alumina, molecular sieves (crystalline zeolite), silica gel, $P_2O_5$, $Mg(ClO_4)_2$, BaO, KOH, NaOH, CaO, $CaSO_4$, MgO, $CaCl_2$ or the like can be used. As the adsorbent 53, activated alumina, molecular sieves, silica gel, or the like can be used.

The closed container 20' can be filled with the $N_2$ gas 21, for instance, by providing the container 20' with a gas inlet and a gas outlet (not shown) and introducing $N_2$ gas from the gas inlet to replace the air in the container 20' with $N_2$ gas, and then closing the inlet and the outlet. Otherwise, the closed container 20' may be assembled in a chamber or a globe box filled with $N_2$ gas.

Because the isolating layers 13a, 13b are effective in reliably preventing the core 10 from deteriorating, it is not necessary but desirable, to include the isolating layers 13a, 13b.

As the inert medium filled into the closed container, a liquid such as a silicone oil or liquid paraffin, or a gas such as He, Ne, Ar, Kr, Xe, or the like can be used without limiting to perfluorocarbon and $N_2$ gas. Further, although the isolating layers 13a and 13b are made of an acrylic resin in the above embodiments, they may be made of other materials such as silicone resin, epoxy resin, fluorocarbon resin, gelatin, casein, cellulose and polyvinylalcohol.

The optical wavelength converter device according to the present invention may employ a two- or three-dimensional optical waveguide type optical wavelength converter device rather than the illustrated fiber type optical wavelength converter device 10.

In the illustrated embodiments, the optical wavelength converter system converts a fundamental wave into a second harmonic. However, the optical wavelength converter system may employ an optical wavelength converter device which converts fundamental waves into a wave which has a frequency equal to the difference between or the sum of the frequencies of the fundamental waves.

With the present invention, as described above, the optical wavelength converter device, which is made of an organic nonlinear optical material for converting the wavelength of a fundamental wave, is confined in an inert medium which prevents the organic nonlinear optical material from subliming or getting modified. The coupling efficiency of the optical wavelength converter device for the applied fundamental is therefore protected from being lowered, and the wavelength conversion efficiency of the optical wavelength converter device is maintained at a higher level. Moreover, the inert medium and the closed container prevent dust from falling on the end surfaces of the optical wavelength converter device, and also protect the end surfaces from damages, therefore wavelength conversion efficiency is also prevented from being lowered.

Although a certain preferred embodiment has been shown and described, it should be understood that many changes and modifications may be made therein without departing from the scope of the appended claims.

I claim:

1. An optical wavelength converter system comprising:
   a light source for emitting a fundamental wave;
   an optical wavelength converter device for converting the wavelength of the fundamental wave and emitting a wavelength-converted wave, said optical wavelength converter device comprising an element made of an organic nonlinear optical material and covered with a cladding layer which has a smaller refractive index than the refractive index of said element;
   an optical system for introducing said fundamental wave into said element of the optical wavelength converter device;
   a closed container housing said optical wavelength converter device, said light source, and said optical system, and having a transparent window for transmitting said wavelength-converted wave therethrough; and
   an inert medium filled in said closed container.

2. An optical wavelength converter system as defined in claim 1, wherein said inert medium comprises a gas selected from the group consisting of $N_2$, He, Ne, Ar, Kr, and Xe.

3. An optical wavelength converter system as defined in claim 1, wherein said inert medium comprises a liquid selected from the group consisting of a perfluorocarbon oil, silicone oil and liquid paraffin.

4. An optical wavelength converter system as defined in claim 1, further including isolating layers mounted on said optical wavelength converter device and keeping said element out of contact with said inert medium.

5. An optical wavelength converter system as defined in claim 4, wherein each of said isolating layers is made of a resin selected from the group consisting of acrylic resin, silicone resin, epoxy resin, fluorocarbon resin gelatin, casein, cellulose and polyvinylalcohol.

6. An optical wavelength converter system comprising:
   a light source for emitting a fundamental wave;
   an optical wavelength converter device for converting the wavelength of the fundamental wave and emitting a wavelength-converted wave, said optical wavelength converter device comprising an element made of an organic nonlinear optical material and covered with a cladding layer which has a smaller refractive index than the refractive index of said element;
   an optical system for introducing said fundamental wave into said element of the optical wavelength converter device;
   a closed container which houses the optical wavelength converter device and is provided with an inlet transparent window which transmits therethrough the fundamental wave emanating from the optical system and an outlet transparent window which transmits therethrough a wavelength-converted wave emitted from the optical wavelength converter device; and
   an inert medium filled in said closed container.

7. An optical wavelength converter system as defined in claim 6, wherein said inert medium comprises a gas selected from the group consisting of $N_2$, He, Ne, Ar, Kr, and Xe.

8. An optical wavelength converter system as defined in claim 6, wherein said inert medium comprises a liquid selected from the group consisting of a perfluorocarbon oil, silicone oil and liquid paraffin.

9. An optical wavelength converter system as defined in claim 6, further including isolating layers mounted on said optical wavelength converter device and keeping said element out of contact with said inert medium.

10. An optical wavelength converter system as defined in claim 9, wherein each of said isolating layers is made of a resin selected from the group consisting of acrylic resin, silicone resin, epoxy resin, fluorocarbon resin gelatin, casein, cellulose and polyvinylalcohol.

* * * * *